United States Patent [19]

Gerber

[11] 4,079,039

[45] Mar. 14, 1978

[54] POLYHETEROCYCLIC POLYMERS DERIVED FROM SUBSTITUTED TETRAAMINO PYRIDINES

[75] Inventor: Arthur H. Gerber, University Heights, Ohio

[73] Assignee: Horizons Research Incorporated, Cleveland, Ohio

[21] Appl. No.: 617,263

[22] Filed: Sep. 26, 1975

Related U.S. Application Data

[63] Continuation of Ser. No. 447,638, Mar. 4, 1974, abandoned.

[51] Int. Cl.² ............................................. C08G 73/18
[52] U.S. Cl. ................................ 260/47 CP; 260/30.2; 260/30.6 R; 260/30.8 R; 260/30.8 DS; 260/32.4; 260/32.6 N; 260/46.5 E; 260/47 UA; 260/49; 260/50; 260/65; 260/78 UA; 260/78 TF; 260/78.41; 428/474

[58] Field of Search ............... 260/47 CP, 78 TF, 49, 260/46.5 E, 65, 47 UA, 78 UA, 78.41, 50

[56] References Cited

U.S. PATENT DOCUMENTS 3,804,804   4/1974   Gerber et al. ................... 260/47 CP Primary Examiner—Lester L. Lee
Attorney, Agent, or Firm—Lawrence I. Field

[57] ABSTRACT

Soluble precyclized precursors to polybenzimidazoles and similar polyheterocyclic polymers are prepared by reacting (1) an acid derivative such as a bis(acid halide) or mono(acid halide)anhydride or dianhydride of a di-, tri-, or tetra-basic acid, with (2) an acid salt of a tetraaminopyridine in which the four position is substituted with an alkyl group, or with (2) an acid salt of an α,α-N,N'-disubstituted tetraaminopyridine, or with (2) an acid salt of a N,N'-disubstituted bipyridyl compound.

16 Claims, No Drawings

POLYHETEROCYCLIC POLYMERS DERIVED FROM SUBSTITUTED TETRAAMINO PYRIDINES

This is a continuation of application Ser. No. 447,638, filed Mar. 4, 1974, and now abandoned.

Polybenzimidazoles are well known in the art but these polymers suffer from poor thermal stability at temperatures of at least 600° F for prolonged exposure and/or limited processability. The polyenzimidazoles prepared from 2,3,5,6-tetraaminopyridine as disclosed in United States Pat. No. Application Ser. No. 151,601 filed June 9, 1971, now U.S. Pat. No. 3,804,804, are thermally stable but show limited solubility in all but highly acidic solvents which is not desirable. The polymers of this invention are derived from tetraamino heterocyclic monomers which are disclosed in a copending United States Patent Application Ser. No. 438,393 filed Jan. 31, 1974 now U.S. pat. No. 3,943,125. The monomers described in that application are substituted tetraaminopyridines with either an alkyl, aryl or arylalkyl substituent on the α- or α-amino group, or by an extension via one or more pyridine rings. These monomers afford polyheterocyclic polymers which are not only thermally stable but show improved solubility in the cyclized uncured state, compared to the corresponding polyheterocyclic polymers prepared from 2,3,5,6-tetraaminopyridine (TAP). Furthermore, the absence of a ring —CH bond which is present in the corresponding polymers prepared from TAP appears to make the cyclized polymers of the present invention less vulnerable to oxidative degradation than those described in my earlier filed application. These properties permit ease of processability into many useful forms for high temperature applications such as in films, coatings, fibers, adhesive and laminating formulations, and as matrices for structural composites.

One object of this invention is to provide soluble uncyclized precursors to the polyheterocyclic polymers of this invention and a process for the preparation of said precyclized polymers.

A further object of this invention is to provide structural features in the precyclized polymers which upon subsequent treatment convert the tractable polybenzimidazole polymers into useful intractable materials while retaining excellent thermal properties.

Useful, potentially thermally stable tractable linear polymers or their uncyclized polymer precursors can be prepared under mild reaction conditions in only very limited instances, including the very sensitive reaction of dianhydrides with bis-o-diaminoaromatics in polar solvents and by reaction of bis(α-dicarbonyl) compounds with bis-o-diaminoaromatics. Use of the very reactive bis(acid halides) for the preparation of thermally stable polymers from bis-o-diaminoaromatics has not yet been found to be practical because undesirable compositions commonly result, either as very low molecular weight or gelled polymeric material.

Soluble, high molecular weight precyclized polymers from which stable polybenzimidazoles can be prepared by cyclodehydration, have been synthesized by reacting (1) bis(acid halides) with (2) the acid salts of 2,3,5,6-tetraaminopyridine or bis-o-diamino-2,2′-dipyridyls as described in Patent Application Ser. No. 151,601, and from bis-o-(aminoanilino) aromatics as reported in Macromolecules 5, 807 (1972). The polybenzimidazoles derived from 2,3,5,6-tetraaminopyridine were not prepared from the high molecular weight organic or inorganic/organic bis(acid halides) utilized in the present invention. The use of these high molecular weight coreactants produces increasingly soluble and processable polymers while still retaining high thermal stability. The N-phenylated polybenzimidazoles derived from the bis-o-(aminoanilino) aromatics have been found to possess a lower thermal stability than the polymers derived from the corresponding heterocyclic tetramines of this invention. This improved thermal stability of polymers containing pyridine nuclei is quite unexpected since polyimides derived from bipyridyl diamines [American Chemical Society, Organic Coatings and Plastics Chemistry Preprints, 33, No. 1, 177 (1972)] have reportedly exhibited poorer thermal stability than the corresponding benzenoid polymers.

The polybenzimidazoles of this invention are derived from the tetraamines represented by Formulae I and II and can be represented by Formulae III and IV:

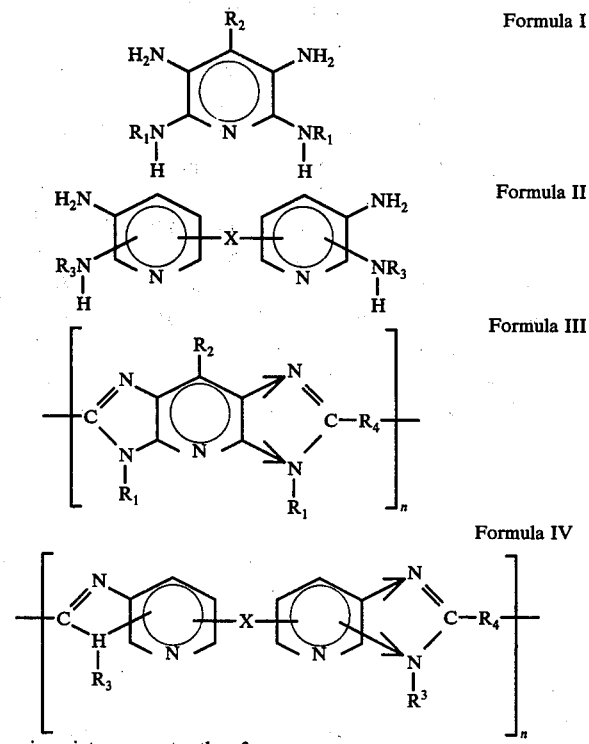

n is an integer greater than 3.

$R_1$ is a monovalent member selected from the group consisting of hydrogen, alkyl, substituted alkyl, alkenyl, substituted alkenyl, arylalkyl, aryl, heteroaryl, heteroarylalkyl, substituted arylalkyl, substituted aryl and substituted heteroaryl, with aryl and heteroaryl including monocyclic, linear bicyclic and fused ring structures, typical substituents within the scope of this invention include: methyl, phenyl, pyridyl, F (aromatic), Cl (aromatic), —CN, —COOH and its salts, —COOC$_6$H$_5$, —SO$_3$H and its salts, —SH, thioaryl, thioalkyl, —CH=CHC$_6$H$_5$, and N,N-(dialkylamino); and all of the $R_1$'s of Formula I need not be identical;

$R_2$ is a monovalent member selected from the group consisting of hydrogen, methyl, ethyl, propyl, butyl and pentyl;

$R_3$ is a monovalent member selected from the group consisting of H and alkyl of 1 to 5 carbon atoms and X is zero or a divalent radical selected from alkylene of 1 to 3 carbon atoms, —S—, —O—, and

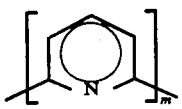

where *m* is equal to 1 or 2; each R₃NH— group is located ortho to an amino group and the pyridyl rings containing the amino groups are joined via the 2,2', 3,3' or 2,3' positions with the proviso that X can equal

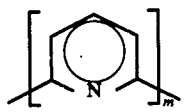

where the pyridyl groups are joined 2,2' and where X equals zero both R₃'s cannot be hydrogen when the pyridyl groups are joined 2,2'; and all of the R₃'s of Formula II need not be identical; and R₄ is a divalent paraffinic, perfluoroalkyl, perfluoropolyalkylene oxide, alkenyl, aromatic or inorganic/organic radical including acylic paraffinic, cycloparafinic, carbocyclic radicals and heterocyclic radicals having a single, multiple or fused ring structure, the multiple ring structures including polyarylenes with 2 to 9 aryl rings in which the aryl groups are bonded directly to each other or bridged by a divalent member selected from the group consisting of alkylene with up to 3 carbon atoms, perfluoroalkylane of 2 to 10 carbon atoms,

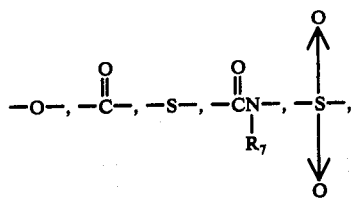

—CH=CH—, 5— and 6— membered heteroaromatics containing at least one nitrogen atom, and mixtures thereof, and substituted aromatic radicals where the substitutents are selected from lower alkyl, F, Cl, —CN, —SO₃H, and

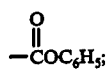

the inorganic/organic radicals consisting of ferrocenyl, carboranyl, and biaryls separated by at least one phosphorus atom or by at least one silanyl or siloxanyl group, and mixtures thereof; R₇ represents H, lower alkyl, or phenyl; R₁, R₂, R₃ and X are as defined in Compounds I and II; and the symbol → indicates possible isomerism.

The polymers represented by Formula III and IV are preferably prepared from the linear precyclized polyamides V and VI, respectively, and acid salts thereof, by a cyclodehydration reaction.

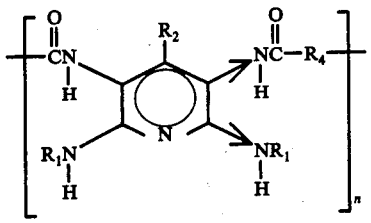

Formula V

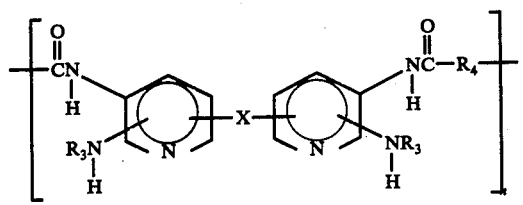

Formula VI

*n* is an integer greater than 3;

wherein each of R₁, R₂, R₃ and R₄ has the meanings previously given to it in Formulas III and IV.

The cyclodehydration of V and VI to III and IV respectively, is accomplished by methods well known in the art, namely, heating under vacuum or inert atmosphere; in tetramethylene sulfone or diphenyl sulfone, or mixtures thereof; in polyphosphoric acid; with molten Lewis acids such as antimony trichloride; or with other chemical reagents, such as organic tertiary amines. The method selected will depend to some extent on the specific material being processed.

The precycled polybenzimidazole precursors (V and VI) are prepared by a process essentially identical to that described in United States Patent Application Ser. No. 151,601. This process involves reacting a tetraamine acid salt with an essentially equimolar amount of an acid derivative such as a bis(acid halide) wherein the halogen is —Cl, —Br or —F, in a polar aprotic solvent at temperatures ranging from about −10° C to about 70° C and preferably below about 40° C to afford soluble high molecular weight precyclized intermediates (V and VI). Preferred acid salts are those derived from HCl, HBr, H₃PO₄, CF₃COOH, alkanesulfonic and perfluoroalkane sulfonic acids.

Preferred aprotic polar organic solvents are those which are at least in part, solvents for at least one of the rectants and which, under the reaction conditions used, do not react with either of the reactants (excluding salt-formation) and which are preferably solvents for the resulting polymer. Suitable aprotic solvents in the polymerization process of this invention include: N,N-dimethylformamide, N,N-dimethylacetamide, N-methylpyrrolidinone, N-methylcaprolactam, hexamethylphosphoramide, tetramethylene sulfone, tetramethylurea and dimethylsulfoxide. The above solvents can be used singly, in combination, or in conjunction with aprotic solvents, such as ethers and aromatic hydrocarbons.

The bis(acid halide) is preferably added to a mixture of tetraamine acid salt and solvent. More than one tetraamine acid salt, including the acid salts of 2,3,5,6-tetraaminopyridine or 4,4',5,5'-tetraamino-2,2'-bipyridine and more than one bis(acid halide) may be used providing that the total moles of tetraamine salt is essentially equal to the total moles of bis(acid halide). In this manner, interpolymers may be prepared which possess desirable properties, such as increased solubility or processability, not shown by either homopolymer alone.

By using tetramethylene sulfone with or without diphenyl sulfone as polymerization solvent, cyclized polymers can directly be prepared from monomers. This is accomplished by careful neutralization of acid with alkali (e.g., NaOH or sodium hexafluoroisopropoxide) after formation of precyclized polymer, followed by gradually heating to reflux of sulfone solvent(s), and maintaining temperature. Cyclized polymers so produced may be isolated by washing free of salt(s) and sulfone solvent(s).

The polymerization process described above can often be accelerated during the latter stages of polycondensation by addition of acid acceptors such as tertiary organic amines. These amines are preferably added after most of the bis(acid halides) have reacted, the amount of amine being such that about 1.1 to 1.5 equivalents of acid per pyridine ring of monomer remains unneutralized. Suitable amines are triethylamine, N-methylmorpholine, and di- and trimethyl pyridine.

Representative tetraamines are as follows:

2,3,5,6-tetraamino-4-methylpyridine
2,3,5,6-tetraamino-4-ethylpyridine
3,5-diamino-2,6-di(methylamino)pyridine
3,5-diamino-2,6-di(benzylamino)pyridine
3,5-diamino-2,6-di(α-pyridylamino)pyridine
3,5-diamino-2,6-di(anilino)pyridine*
3,5-diamino-2,6-di(m-cyanoanilino)pyridine
3,5-diamino-di(p-mercaptoanilino)-4-methylpyridine
3,5-diamino-2,6-di(p-stilbylamino)pyridine
2,3,5-triamino-6-anilinopyridine
3,5-diamino-4-methyl-2,6-di(p-sulfoanilino)pyridine
3,5-diamino-2,6-di(allylamino)pyridine
5,5'-diamino-4,4'-di(methylamino)-2,2'-bipyridine
di(5-amino-6-ethylamino-2-pyridyl)ether
5',5''',6',6'''-tetraamino-2:6-di-2'-pyridylpyridine 3,5-diamino-2,6-di[m-(endo-cis-bicyclo[2.2.1]-5-heptene-2,3-imido)anilino]pyridine. (This compound is 3,5-diamino-2,6-di(anilino)pyridine (above)* in which one meta hydrogen of each anilino substituent has been replaced by a

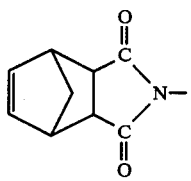

group.)

Tetraamines which have functionally reactive groups other than amine (-NH₂ or -NH) are preferably used in small amounts up to 25 mole % as their acid salts to prepare polybenzimidazole copolymers or terpolymers. The presence of such functional groups is desirable for increasing initial polymer solubility or for subsequent crosslinking to intractable materials. These reactive groups include alkenyl,

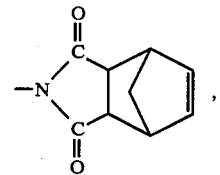

—C₆H₄—CH=CHC₆H₅, —CN, —SH, —COOH, —CO₂C₆H₅ and —SO₃H. These groups are either thermally labile to condensation reactions or addition reactions or can be thermally condensed with amino or amido groups present elsewhere in the polymer or present in an additive formulated with the polymer.

Bis (acid halides) suitable for the practice of this invention are represented by the formula $$Q-\overset{O}{\underset{\|}{C}}-R_8-\overset{O}{\underset{\|}{C}}-Q,$$

where Q is a halogen selected from F, Cl, or Br. Some representative bis(acid halides) found to be suitable for practicing this invention are derived from the following dicarboxylic acids and their ring substituted derivatives where the substitutents are selected from lower alkyl, F, Cl, —CN, —SO₃H,

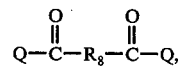

providing that the —CN or

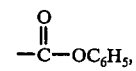

group is neither ortho or peri to a —COOH group, as well as those diacids where one or both —COOH groups have one ortho

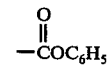

group where $R_5$ is alkyl of 1 to 4 carbon atoms;

terephthalic acid
2,5-dichloroterephthalic acid
2,5-dimethylterephthalic acid
isophthalic acid
4-carbomethoxyisophthalic acid*
5-cyanoisophthalic acid
5-sulfoisophthalic acid
4,6-dicaboethoxyisophthalic acid*
5-carbophenoxyisophthalic acid
fumaric acid
4,4'-stilbenedicaboxylic acid
2,6-naphthalenedicarboxylic acid
4,8-dicarbomethoxy-1,5-naphthalenedicarboxylic acid*
diethylester (non-vicinal) of 3,4-dicarboxy-1,2,3,4-tetrahydro-1-naphthalenesuccinic acid*
2,5-furandicaboxylic acid
2,8dibenzofurandicarboxylic acid
3,5-pyridinedicaboxylic acid
2,5-pyrazinedicarboxylic acid
2,7-anthraquinonedicaraboxylic acid 1,1'-ferrocenedicarboxylic acid azelaic acid 1,5-cyclooctadiene-1,5-dicarboxylic acid
1,3,5,7-cyclooctatetraene-1,5-dicarboxylic acid
1,4-cyclohexanedicarboxylic acid
bis(p-caboxyphenyl)methyl phosphine oxide
1,2,5-thiadiazole-3,4-dicarboxylic acid *(when $R_2$ of I and $R_3$ of II are H)
1,3-bis-(α-carboxyphenyl-n-propyl)1,1-3,3-tetramethyl
2,5-bis-(m-carboxyphenyl)-1,3,4-oxadiazole
3,4-bis-(p-carboxyphenyl)-1,3,4-oxadizole
4,4'-sulfonyldimethylene dibenzoic acid
1,7-dicarbadodecaborane(12)-1,7-dicarboxylic acid

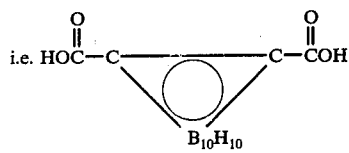

and those represented by the following formula

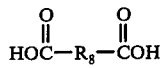

where $R_8$ equals

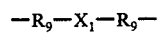

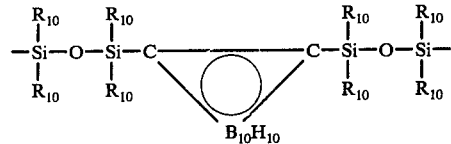

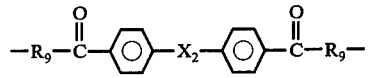

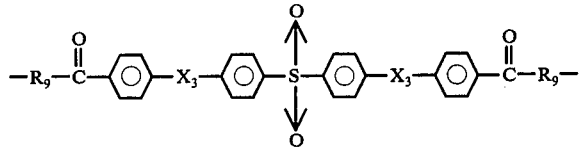

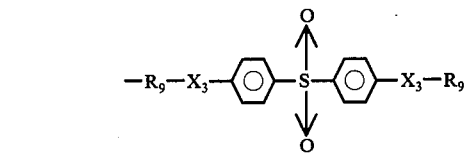

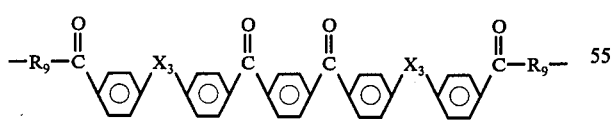

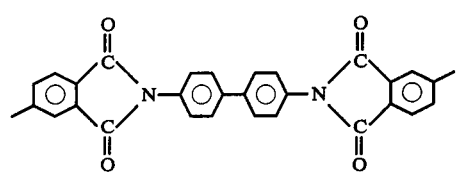

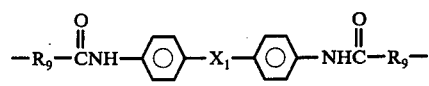

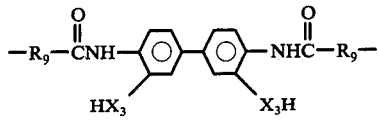

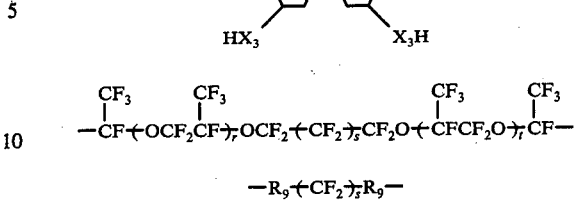

where $R_9$ equals m- or p- phenylene and $X_1$ is selected from zero and the divalent radicals, alkylene of 1 to 3 carbon atoms,

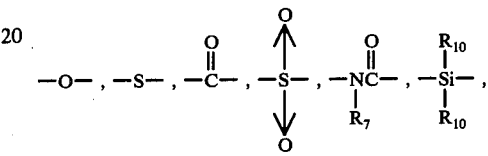

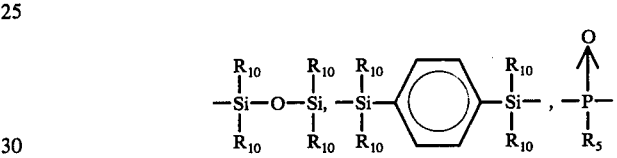

where $R_7$ is H, lower alkyl or $C_6H_5$, and $R_{10}$ is $CH_3$ or $C_6H_5$, $R_5$ is lower alkyl, $X_2$ is zero or —O— and $X_3$ is —O— or —S—, r and t are integers from 1 to 10 and s is an integer from 2 to 10.

Bis(acid halides) which contain a carbalkoxy group ortho or peri to one or both acid halide groups when $R_4$ is arylene or heteroarylene and located 1,2 or 1,3 when $R_4$ is alkylene or cycloalkylene afford percyclized polyamide precursors upon reaction with the tetraamines I and II, preferably when $R_1$ and $R_3$ of I and II, respectively are hydrogen. However, the cyclodehydrated products of these precyclized polymers (for $R_1$ and $R_3$ = H) are not polybenzimidazoles represented by V and VI, but are the related poly(benzimidazole/imidazopyrrolones) and polyimidazopyrrolones ("pyrrones"), represented by Formulae VII and VIII, respectively:

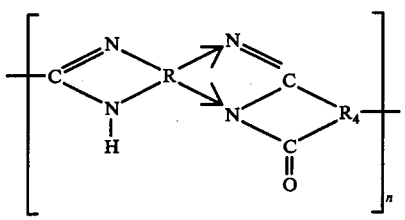

Formula VII ($R_4$ is trivalent here)

where n is an integer greater than 3.

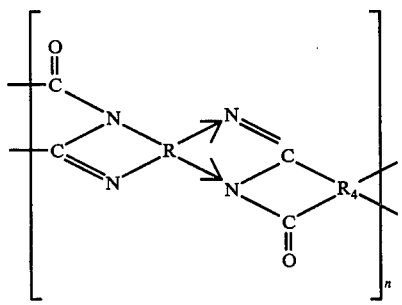

Formula VIII
(R₄ is tetravalent here)
where n is an integer greater than 3.

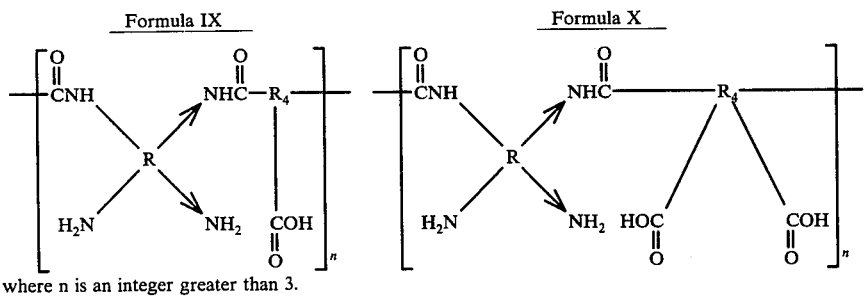

where n is an integer greater than 3.

hydrides and dianhydrides described in said United States Patent Application.

Polymers VII and VIII can also be obtained by reaction of tetraamines I (where $R_1$ = H) and II (where $R_3$ = H) with mono(acid halide) anhydrides of tribasic acids and dianhydrides of tetrabasic acids respectively, to give the precyclized polyamide precursors IX and X which upon cyclodehydration afford VII and VIII, respectively.

Each —COOH group of $R_4$ in IX and X is located 1,2 or 1,3 to the

group on carbons of the $R_4$ group, when $R_4$ is alkylene or cycloalkylene and ortho or peri to the

group when $R_4$ is arylene or heteroarylene.

Suitable mono(acid halide) anhydrides and dianhydrides for practicing this invention may be obtained from tribasic and tetrabasic acids, respectively, derived from the above dibasic acids $R_8(COOH)_2$ by substituting with a —COOH group up to two monovalent groups of $R_8$. Said —COOH groups to be introduced will be on β or α-carbons of $R_8$ when $R_8$ is alkylene or cycloalkylene providing that only one —COOH group is substituted on a given carbon atom, or substituted on the ortho or peri carbon when $R_8$ is arylene or heteroarylene, providing that three consecutive carbons are not substituted with a —COOH group. Representative mono(acid halide) anhydrides and dianhydrides that have been found suitable for practicing this invention are as follows:

trimellitic anhydride monoacid chloride
3,4,4'-benzophenonetricarboxylic anhydride monoacid chloride
pyromellitic dianhydride
3,3',4,4'-benzophenonetetracarboxylic dianhydride
pyrazinetetracarboxylic dianhydride
1,4,5,8-naphthalenetetracarboxylic dianhydride
bis(3,4-dicarboxyphenoxyphenyl)sulfone dianhydride
1,3-bis(3,4-dicarboxyphenyl)hexafluoropropane dianhydride
3,4-dicarboxy-1,2,3,4-tetrahydro-1-naphthalene-succinic dianhydride
1,3,5,7-cyclooctatetetraene-1,2,5,6-tetracarboxylic dianhydride
2,2-bis(3',4'-dicarboxyphenyl)hexafluoropropane dianhydride where R is a tetravalent heteroaromatic radical represented by:

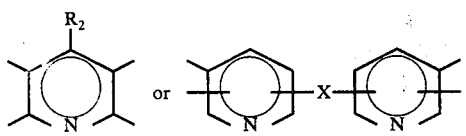

where $R_2$ and X are as previously defined for Formulae I and II, and the symbol → represents possible isomerism.

Polymers represented by VII and VIII where R is

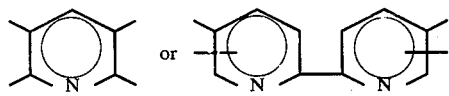

and $R_4$ is selected from the group alkylene, cycloparaffinic, monocyclic aryl or heteroaryl, diaryl, diaryls bridged by alkylene of 1 to 3 carbon atoms,

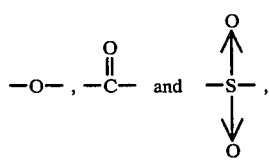

and fused carbocyclic and heteroarylene structures containing 2 and 3 rings are described in United States Patent Application Ser. No. 151,601. It has been found that polymers VII and VIII where $R_4$ is selected from polyarylene radicals containing 3 to 9 aryl groups bonded linearly or organic/inorganic radicals containing one or more of the elements, B, Fe, or Si show improved solubility and processability as compared with the polymers derived from mono(acid halide) an- High molecular weight acid derivatives are particularly desirable because the resulting cyclodehydrated polymers possess enhanced solubility and hence processability, but more importantly, a lower percent of water is evolved from the polyamide precursor during cyclodehydration. Decreased volatiles during cyclization lead to decreased voids in the final composition which therefore will possess greater integrity and thermal stability.

The acid derivatives, particularly the bis (acid halides), employed in the preparation of the polymers of this invention are very moisture sensitive. Reaction with water during polymerization will lead to partial destruction of the acid derivative with attendant stoichiometric imbalance, lowering of molecular weight, and a decrease in thermal stability of the resulting cyclized polymer. This can be a serious problem with tetraamine salts that are difficult to obtain as highly pure anhydrous materials. It has been found that addition of certain acidic inorganic oxides can scavenge moisture without adversely affecting the polymerization reaction. Both $P_2O_5$ and $B_2O_3$ have been used successfully as in situ drying agents. For example, $P_2O_5$ in sufficient quantity upon prolonged contact with a mixture of the amine acid salt(s) and polar aprotic solvent has been used to remove at least 10 weight % water present in the salt(s). Polymer can subsequently be purged of $P_2O_5$ or $H_3PO_4$ by washing with water or methanol.

This invention and United States Patent Application Ser. No. 151,601 describe polyheterocyclic polymers and their corresponding precyclized precursors derived from 2,3,5,6-tetraaminopyridine. However, the 2,3,5,6-tetraaminopyridine derived polymers of this invention, unlike those disclosed in my earlier application, differ in that they are derived from acid derivatives that contain either (1) more than two aryl groups bonded linearly; (2) perfluoropolyalkylene oxide nuclei; or (3) nuclei containing one or more of the inorganic elements B, Fe or Si. Precyclized polyamides as well as the cyclized polybenzimidazoles derived from bis(acid halides) containing the above nuclei show improved solubility and processability as compared with the polymers described in United States Patent Application Ser. No. 151,601.

Still another method of tailoring polymer properties involves copolymerization with an acid salt of an aromatic diamine or an aromatic triamine, or mixtures thereof, provided that the total moles of amine(s) is essentially equal to or greater than the total moles of acid reactant(s). There appears to be no limit as to the amount of tetraamine acid salt that can be replaced by a diamine or triamine acid salt, or mixtures thereof, so that the mole ratio of tetraamine(s) to diamine(s) and/or triamine(s) can vary from 99/1 to 1/99. Furthermore, if the $R_1$ groups of the tetraamine I, or if the $R_3$ group of the tetraamine II is arylene, interpolymerization with diamines may be effected with the free bases instead of their acid salts.

Representative diamines that are suitable are those represented by the formula $$R_{12}N-R_{11}-NR_{12}$$
$$\phantom{R_{12}N-}H\phantom{-R_{11}-}H$$

wherein $R_{11}$ is a divalent aromatic radical selected from

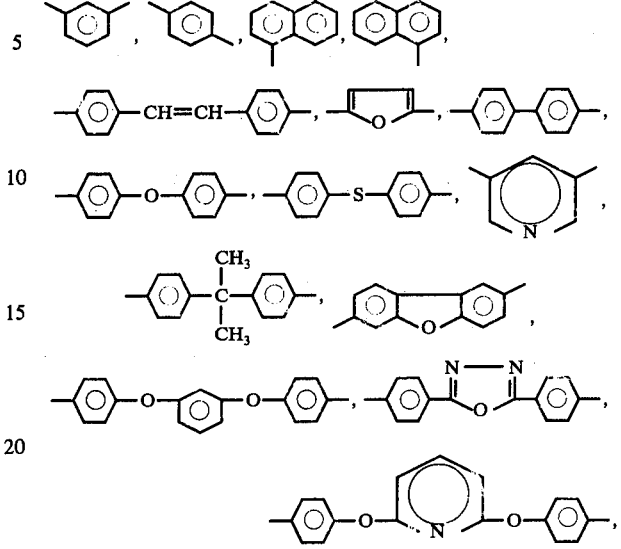

and the ring methylated derivatives of said radicals; $R_{12}$ is H or $CH_3$.

Derivatives of the above diamines are also suitable. When the acid derivative is a bis(acid halide), for example, diamines which contain a hydroxyl, mercapto or $-SO_2NH_2$ group ortho to one or both amine groups provided that no three consecutive adjacent ring positions are substituted by amine, hydroxyl, mercapto or $-SO_2NH_2$ groups, are suitable.

Triamines, as their acid salts, which can be copolymerized with the tetraamines used in this invention are shown by the following formulae:

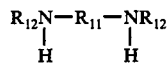

where $R_1$ has been previously defined for formula I and each $R_2$ is hydrogen or alkyl of 1 to 3 carbon atoms and both $R_2$'s need not be identical. The above triaminopyridines are disclosed in my United States Patent Application Ser. No. 438,392 filed Jan. 31, 1974 and now abandoned.

By increasing the mole ratio of polyamine salt(s) to acid derivative to greater than unity, amine-terminated adducts and uncyclized polymers of lower molecular weight may be obtained. These materials can then be used as reactants for the preparation of high molecular weight polymers which may contain monomer residues other than the two present in the original polymerization.

The following examples are illustrative or preferred embodiments of this invention and are not to be construed as limiting the invention in any way.

EXAMPLE 1

Precyclized Polymer and Polybenzimidazole from 3,5-Diamino-2,6-di(anilino)pyridine Dihydrochloride and Isophthaloyl Chloride Isophthaloyl chloride (5.16 g, 0.0254 mole) was added over five minutes under a nitrogen atomsphere to a stirred cold mixture of 9.25 g (0.0254 mole) 3,5-diamino-2,6-di(anilino)-pyridine dihydrochloride and 45 g N-methylpyrrolidinone. The reaction was maintained at 5°-10° C for several hours and then kept at room temperature for 21 hours. The polymer solution was poured into 200 ml methanol with good stirring. The precipitate of precyclized polymer was filtered, washed well with methanol twice and vacuum dried overnight at 50°-55° C. The polymer (9.8 g) was obtained as a yellow-green powder which was soluble in N,N,-dimethylformamide (DMF), dimethylsulfoxide (DMSO), and formic acid. Anal. Calcd. for $C_{25}H_{19}N_5O_2 \cdot HCl$: C, 65.5; H, 4.4; N, 15.3; Cl, 7.8. Found: C, 67.5; H, 4.6; N, 15.4; Cl, 2.9.

This polymer was isolated at its neutral salt as follows: the hydrochloride polymer (3.0 g) was dissolved in DMF (25 ml), treated with triethylamine (0.7 g) and then precipitated into methanol and purified by further washing with methanol and vacuum drying as described above. The neutral precyclized polymer was soluble in DMF, DMSO and formic acid. Anal, Calcd. for $C_{25}H_{19}N_5O_2$: C, 71.3; H, 4.5; N, 16.6. Found C, 71.1; H, 4.7; N, 16.6.

Similarly other acid salts of the above precyclized polymer may be formed by replacing the dihydrochloride salt by the hydrobromide or methanesulfonate, or trifluoroacetate salts.

To above precyclized hydrochloride polymer (3.0 g) was converted to the cyclized polybenzimidazole (2.55 g) by heating for two hours under vacuum at each of the following temperatures, 150°, 200°, 300°, and 350° C. The resulting polybenzimidazole was soluble in formic acid, trifluoroacetic acid and methanesulfonic acid. Anal. Calcd. for $C_{25}H_{15}N_5$: C, 77.9; H, 3.9; N, 18.2. Found: C, 77.8; H, 4.0; N, 18.1. This polymer possessed outstanding thermo-oxidative stability retaining 99% of its weight after 500 hours isothermal aging in air at 600° F (316° C). In comparison the polybenzimidazole derived from 2,3,5,6-tetraaminopyridine·3HCl and isophthaloyl chloride retained only 87% of its weight after 300 hours and poly[2,2′-(m-phenylene)-5,5′-bibenzimidazole] retained only 57% of its weight after 200 hours in air at 600° F.

An amine terminated precyclized hydrochloride polymer was obtained by reaction of isophthaloyl chloride (0.0229 mole) with 3,5-diamino-2,6-di(anilino)pyridine dihydrochloride (0.0254 mole) as described above. This polymer could be further extended in molecular weight by reaction in N-methylpyrrolidinone with one of the following: 2,6-naphthalene diacid dichloride, dodecanedioic acid dichloride, or 3,3′,4,4′-benzophenonetetracarboxylic dianhydride.

EXAMPLE 2

Precyclized Polymer and Polybenzimidazole from 3,5-Diamino-2,6-di(anilino)pyridine Dihydrochloride and 4,4′-[sulfonylbis(p-phenyleneoxy]di-benzoyl Chloride The polymerizaton described in Example 1 was repeated using 10.36 g (0.0196 mole) 4,4′-[sulfonylbis(p-phenyleneoxy]-di-benzoyl chloride and 7.15 g (0.0196 mole) 3,5-diamino-2,6-(dianilino)pyridine dihydrochloride. The precyclized polymer which was obtained in excellent yield was very soluble in DMF, DMSO, and formic acid. Anal. Calcd. for $C_{43}H_{31}N_5O_6S \cdot HCl$: C, 66.0; H, 4.1; N, 8.9; Cl, 4.5; S, 4.1. Found: C, 67.5; H, 4.3; N, 9.0; Cl, 1.1; S, 4.4. This polymer was redissolved in 75 ml DMF, and 5 ml triethylamine added. After stirring 15 minutes the polymer solution was precipitated into 400 ml methanol, filtered, washed and dried to give the neutral precyclized polymer (12.7 g, 87%). Anal. Calcd. for $C_{43}H_{31}N_5O_6S$: C, 69.3; H, 4.2; N, 9.4; S, 4.3. Found: C, 68.4; H, 4.6; N, 8.9; S, 4.4.

The above precyclized polymer (3.0 g) was converted to the cyclized polybenzimidazole (2.68 g) as described in Example 1. This polymer was insoluble in DMF or DMF-DMSO but was very soluble in formic acid or trifluoroacetic acid even when the latter solvent was diluted with hexafluoroisopropyl alcohol or 3,3,3,2,2-pentafluoropropanol. Anal. Calcd. for $C_{43}H_{27}N_5O_4S$: C, 72.8; H, 3.8; N, 9.9; S, 4.5. Found: C, 73.5; H, 3.9; N, 9.2; S, 4.0.

EXAMPLES 3-18

The precyclized polymers and acid salts thereof and polybenzimidazoles of Examples 3-18 were prepared following the procedure of Example 1, except employing the indicated amine acid salt(s) (0.1 mole) and acid derivative (0.1 mole), bis[acid halide(s)], mono(acid halide anhydride), or dianhydride and N-methylpyrrolidinone (175 ml), unless stated otherwise; in the amine salts of the Examples TAP represents 2,3,5,6-tetraaminopyridine and DAP represents 3,5-diaminopyridine.

| Example | Amine Acid Salt(s) |
|---|---|
| 3. | 4-CH₃-TAP . 3HCl |
| 4. | 4-CH₃-TAP . 3HCl |
| 5.(a) | 4-CH₃TAP . 3HCl |
| 6. | TAP . 3HCl |
| 7. | 4-CH₃-TAP . 3HBr (0.095 mole9, 2,6-di(p-carbophenoxyphenyl)-DAP . 2HCl (0.005 mole) |
| 8. | 2,6-di(benzylamino)-DAP . 3HCl(0.090 mole), 2,6-di(p-sulfoanilino)-DAP . 2HCl (0.010 mole) |
| 9.(b) | TAP.3HCl (0.090 mole), 2,6-di(m-R-anilino)-DAP . 2HCl (0.010 mole) where R = 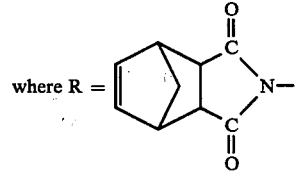 |
| 10. | 2,6-di(α-pyridylamino)-DAP . 3HBr |
| 11. | TAP . 3HCL (0.090 mole), 2,6-di(p-stilbylamino)-DAP . 2HCl (0.010 mole) |
| 12.(c) | 2,6-di(m-toluidino)-DAP . 2CF₃SO₃H |
| 13. | 2,6-di(p-CH₃S-anilino)-DAP . 2HCl |
| 14. | 2,6-di(methylamino)-DAP . 3CH₃SO₃H (0.090 mole), 2,6-di(p-cyanobenzylamino)-DAP . 3CH₃SO₃H (0.010 mole) |
| 15. | 5,5′-diamino-6,6′-di(ethylamino)-2,2-bipyridine . 4HCl |
| 16. | 5,5′-diamino-4,4′-di(methylamino)-2,2′-bipyridine . 4HCl |
| 17.(d) | 5′,5″,6′,6″-tetraamino-2:6-di-2′-pyridylpyridine . 4HCl |

-continued

| Example | Amine Acid Salt(s) |
|---|---|
| 18.(e) | 4-CH₃-TAP · 3CH₃SO₃H |

(a)Cyclodehydrated product is a poly(benzimidazole-imidazopyrrolone).
(b)Cyclodehydrated product is insoluble in CH₃SO₃H. In contrast, in the absence of the R-anilino comoner and using 0.100 mole TAP · 3HCl a product soluble in CH₃SO₃H was obtained.
(c) Hexamethylphosphoramide/F[CF(CF₃)CF₂O]₂CHFCF₃ (lv/lv) was substituted for the N-methylpyrrolidinone.
(d)The cyclodehydrated product is a polyimidazopyrrolone.
(e)After reaction at room temperature the mixture was heated 10 hours at 40–45° C prior to work-up.

Examples 3 – 18
Acid Derivative

3. 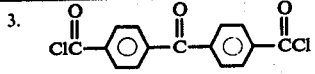

4.(d) 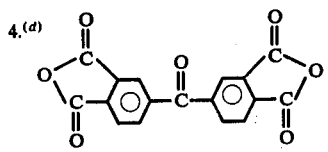

5. 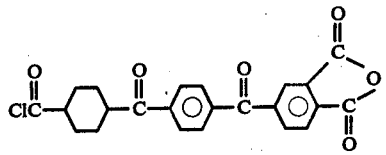

6. 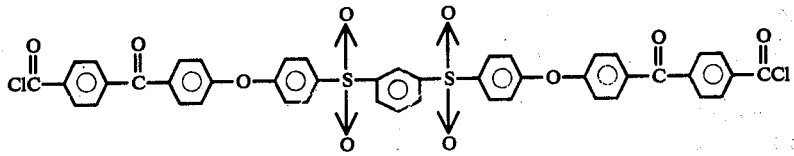

7. 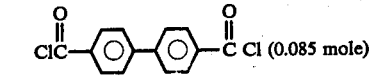
(0.085 mole)

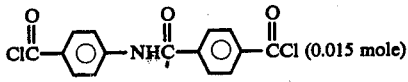
(0.015 mole)

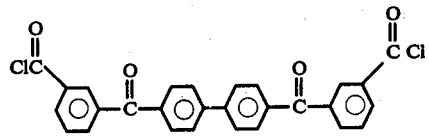
(0.090 mole)

8. 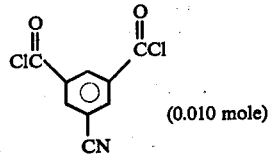
(0.010 mole)

9.(d) 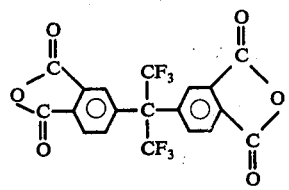

10. 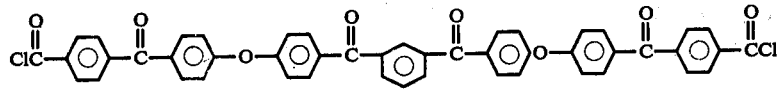

11. 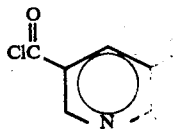

| Example | Examples 3 – 18 Acid Derivative |
|---|---|
| 12. | 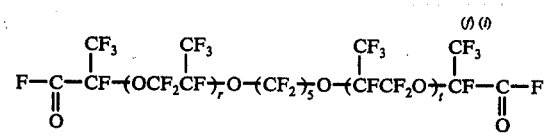 |
| 13.(i) | 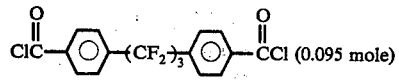 (0.095 mole)<br>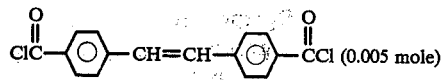 (0.005 mole)<br>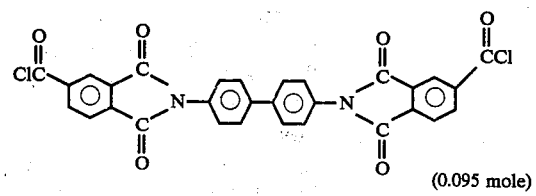 (0.095 mole) |
| 14. | 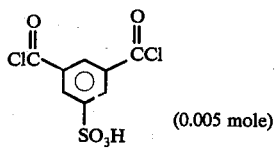 (0.005 mole) |
| 15. | 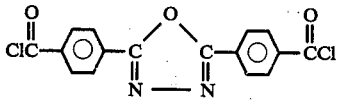 |
| 16. | 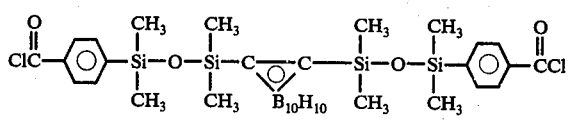 (g) |
| 17. | 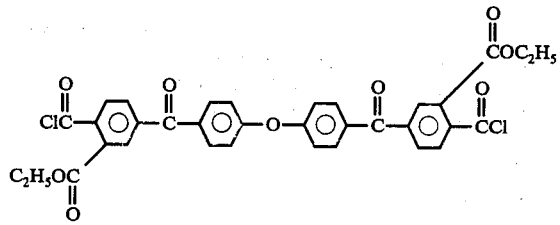 |
| 18. | 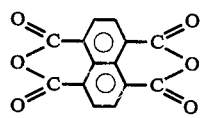 (h) |

(f)As the diacid fluoride, r and t are integers such that the average molecular weight is 1300.
(i)Cyclohydrated product obtained by heating precyclized polyamide in polyphosphoric acid.
(g)—C⌬C— = 1,7-dicarbodecaboranyl.
    B₁₀H₁₀
(h)The cyclodehydrated product is essentially a polybenzimidazobenzophenanthroline.

EXAMPLES 19–24

The procedure of Example 3 was followed except that the 2,3,5,6-tetraamino-4-methylpyridine.3HCl was substituted or partially replaced by the indicated tetraamine and diamine or triamine acid salts. In this manner the corresponding precyclized and cyclized polymers of Examples 19–24 were obtained.

| Ex. | Tetraamine Acid Salt (mole %) | Di- or Triamino Acid Salt (mole %) |
|---|---|---|
| 19. | 2,6-di(n-butylamino)-3,5-diamino-4-methylpyridine | 3,3′-dimercaptobenzidine-2HCl (50) |

-continued

| Ex. | Tetraamine Acid Salt (mole %) | Di- or Triamino Acid Salt (mole %) |
|---|---|---|
| | 3HCl (50) | |
| 20. | 2,3,5,6-tetraamino-4-ethylpyridie . 3HCl (50) | 3,3'-dihydroxybenzidine-2HCl (50) |
| 21. | 2,3,5,6-tetraamino-4-methylpyridine . 3HCl (50), 2,6-di(p-mercapto-anilino)-3,5-diamino-pyridie . 2HCl (10) | benzidie-2HCl (40) |
| 22. | 2,3,5-triamino-6-anilino-pyridie . 2HCl (40) | 2,3,5-triaminopyridie-3HCl (60) |
| 23. | 2,3,5,6-tetraamino-4-methylpyridie . 3 HCl (45) | 2,3,5-triamino-4,6-dimethyl-pyridine-3HCl (45), 4,4'-diaminostilbene-2HCl (10) |
| 24. | di(5-amino-4-methyl-amino-2-pyridyl)ethyer . 4HCl (60) | 2,4-diaminobenzenesulfon-amide (40) |

EXAMPLE 25

Effect of $P_2O_5$ on the Preparation of Amine Terminated Precyclized Polymer Derived From 2,3,5,6-Tetraaminopyridine-3HCl·$H_2O$, 3,5-Diamino-2,6-di(anilino)pyridine·2HCl, And Terephthaloyl Chloride A. With $P_2O_5$ Terephthaloyl chloride (0.090 mole) was added over 30 minutes, under a nitrogen atmosphere, to a well stirred mixture (0°–5° C) of $P_2O_5$ (5.0 g), 2,3,5-6-tetraaminopyridine trihydrochloride monohydrate (0.050 mole), 3,5-diamino-2,6-di(anilino)pyridine dihydrochloride (0.050 mole), and N-methylpyrrolidinone (100 g). The mixture of $P_2O_5$, amine salts and solvent had been previously stirred under nitrogen 10 hours at 25° C. The reaction was maintained at about 5° C for 3 hours and then kept at room temperature for 4 hours. The polymer solution was poured into a solution of methanol (200 ml) and water (50 ml). The precipitate of precyclized amine-terminated polymer (85%) was filtered, washed well with methanol and vacuum dried overnight at 50°–55° C.

B. Without $P_2O_5$

The procedure of Example 24A was followed except that no $P_2O_5$ was employed. In this case the yield and molecular weight of precyclized polymer was considerably reduced.

I claim:

1. Polymers consisting essentially of recurring units of the following structural formula:

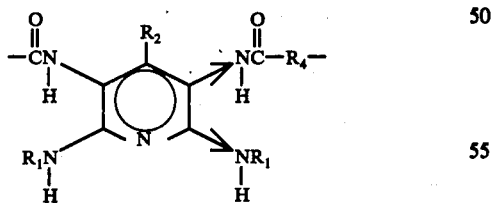

wherein $R_1$ represents a monovalent member selected from the group consisting of alkyl, substituted alkyl, alkenyl, substituted alkenyl, arylalkyl, aryl, heteroaryl, heteroarylalkyl, substituted arylalkyl, substituted aryl and substituted heteroaryl, with aryl and heteroaryl including monocyclic, linear bicyclic and fused ring structures;
  wherein the substituents on said members are selected from the group consisting of methyl, phenyl, pyridyl, —CN, —COOH and salts thereof,

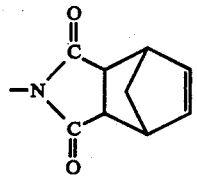

—$COOC_6H_5$, —$SO_3H$ and salts thereof, —SH, thioaryl, —CH=$CHC_6H_5$ and N,N-dimethylamino;

$R_2$ represents a monovalent radical selected from the group consisting of hydrogen, methyl, ethyl, propyl, butyl and pentyl; and $R_4$ represents a divalent radical selected from the group consisting of paraffinic, cycloparaffinic, perfluoroalkyl, perfluoropolyalkylene oxide, alkenyl, carbocyclic, heterocyclic, and inorganic/organic radicals, said cyclic radicals having a single, multiple or fused ring structure, the multiple ring structures including polyarylenes with 2 to 9 aryl rings in which the aryl groups are bonded directly to each other or bridged by a divalent member selected from the group consisting of alkylene with up to 3 carbon atoms, perfluoroalkylene of 2 to 10 carbon atoms,

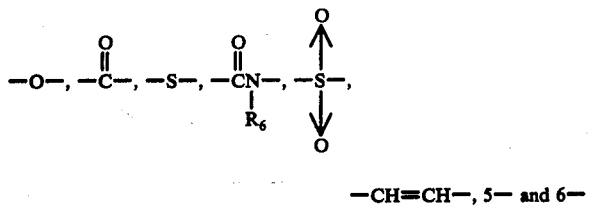

—CH=CH—, 5— and 6— membered heterocyclics containing at least one nitrogen atom, and mixtures thereof, and substituted aromatic or heterocyclic radicals where the substituents are selected from lower alkyl, phenyl, F, Cl, —CN, —$SO_3H$, and

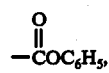

with the proviso that the —CN, —$SO_3H$ or

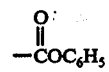

groups are not ortho or peri to a

group bonded to $R_4$; said inorganic/organic radicals being selected from the group consisting of ferrocenyl, carboranyl, and biaryls separated by at least one phosphorus atom or by at least one silanyl or siloxanyl group, and mixtures thereof;

with the proviso that $R_4$ is a divalent radical or substituted divalent radical of formula

where Z is selected from the group consisting of H, CH$_3$, and

and the Z groups are not required to be identical and are located 1,2 or 1,3 to a

group bonded to R$_4$ when R$_4$ is alkylene or cycloalkylene but located ortho or peri to said

group when R$_4$ is arylene or heterocyclic, with the proviso that both Z groups are not ortho to the same

group when the Z groups are

when R$_4$ is perfluoropolyalkylene oxide or carboranyl the

counterpart does not exist; R$_5$ is H or alkyl of 1 to 5 carbon atoms, R$_6$ represents H, lower alkyl, or phenyl; the symbol → denotes possible isomerism; each of all the R$_1$'s, R$_2$'s and R$_4$'s need not be identical;

and the acid salts thereof, the acid of said salts being selected from the group consisting of HCl, HBr, H$_3$PO$_4$, CH$_3$SO$_3$H, CF$_3$SO$_3$H, CF$_3$COOH and mixtures of said salts.

2. The cyclodehydrated products of claim 1.

3. Polymers consisting essentially of recurring units of the following structural formula:

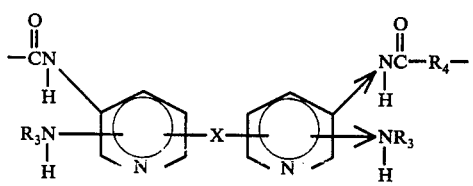

wherein

R$_3$ is a monovalent member selected from the group consisting of alkyl of 1 to 5 carbon atoms;

X is selected from the group consisting of a divalent covalent bond and a divalent radical selected from the group consisting of alkylene with 1 to 3 carbon atoms, —O—, —S—, and

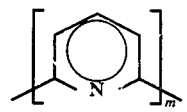

in which m is 1 or 2;

and each of the R$_3$NH— groups is bonded to a carbon α or γ to the ring nitrogen provided that no R$_3$NH— group is located ortho to X; and X joins the pyridyl groups bearing the amine substituents via the 2,2'; 2,3'; or 3,3' positions and when X equals

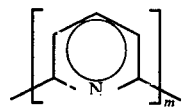

the pyridyl groups are joined 2,2' and the R$_3$NH— groups are bonded α to the heterocyclic ring nitrogen and located ortho to the

groups.

4. The cyclodehydrated products of claim 3.

5. The polymers and the acid salts thereof of claim 1 where the

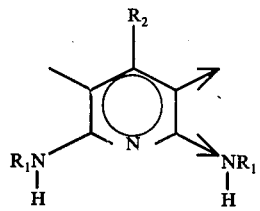

radical is partially replaced by a radical represented by at least one of the following formulae:

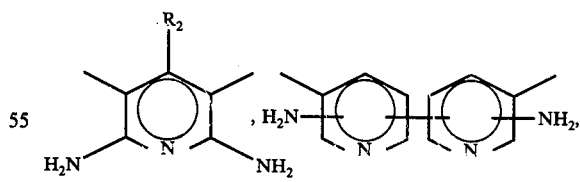

(α or γ)   (α or γ)
(alpha or gamma)

and —R$_7$—;

wherein R$_7$ is a divalent radical selected from the group consisting of carbocyclic aromatic radicals, biphenyls, single, fused, and multiple ring heterocyclic radicals and carbocyclic aromatic radicals bridged by a radical selected from the group of alkylene of 1 to 3 carbon atoms, oxygen, and sulfur and said aromatic radicals being those where up to two hydrogens ortho to an amine group are replaced by hydroxyl, mercapto or —SO₂NH₂ with the provision that no three consecutive adjacent ring positions are substituted by amine, hydroxyl, mercapto or —SO₂NH₂ groups;

R₈ is a monovalent radical selected from the group consisting of hydrogen and alkyl of 1-5 carbon atoms;

each of all of the R₁, R₂ and R₈ groups need not be identical and R₁ and R₂ are as defined in claim 1.

6. The cyclodehydrated products of claim 5.

7. The polymers and the acid salts thereof of claim 3 consisting essentially of recurring units of the following structural formula

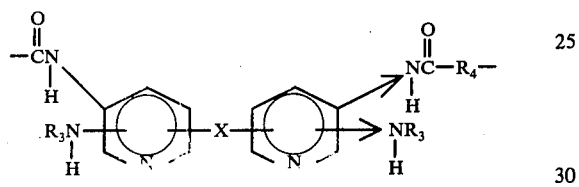

wherein at least some of said recurring units are replaced by a radical represented by units of at least one of the following formulae:

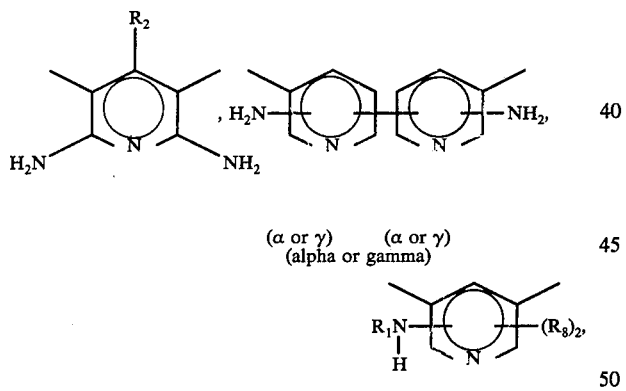

and —R₇—;

R₂ represents a monovalent radical selected from the group consisting of hydrogen, methyl, ethyl, propyl, butyl and pentyl; and each of all of the R₁ and R₈ groups need not be identical and R₁, R₂, R₇ and R₈ are as defined in claim 5.

8. The cyclodehydrated products of claim 7.

9. The polymers and acid salts thereof represented by the following repeating structural formula:

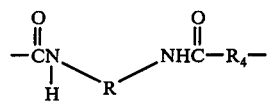

where R is selected from the group consisting of

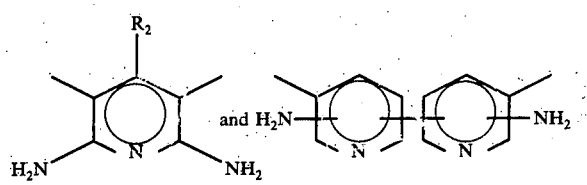

(α or γ) (α or γ)
(alpha or gamma)

the bipyridyl radical being joined via the 2,2' or 3,3' positions and R₄ is selected from perfluoropolyalkylene oxide, polyarylenes with 3 to 9 aryl rings in which the aryl groups are bonded directly to each other or by a divalent member as defined in claim 1 for R₄ and substituted polyarylenes where the substituents are selected from lower alkyl, phenyl, F, Cl, —CN, —CO₂C₆H₅ and —SO₃H with the proviso that any such —CN, —CO₂C₆H₅ or —SO₃H groups are not located ortho to a

group bonded to R₄, and inorganic/organic radicals selected from the group consisting of ferrocenyl, carboranyl, and biaryls separated by at least one phosphorus atom or by at least one silanyl or siloxanyl group, and mixtures thereof; and R₂ is a monovalent member selected from the group consisting of hydrogen, methyl, ethyl, propyl, butyl and pentyl.

10. The cyclodehydrated products of claim 9.

11. The polymers and acid salts thereof represented by the following repeating structural formula:

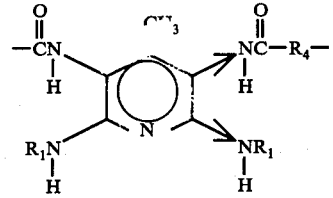

where R₁ is selected from the group consisting of CH₃—, C₆H₅—, C₆H₅CH₂—, and C₅H₄N-(pyridyl), and R₄ is selected from the group consisting of m- or p-phenylene,

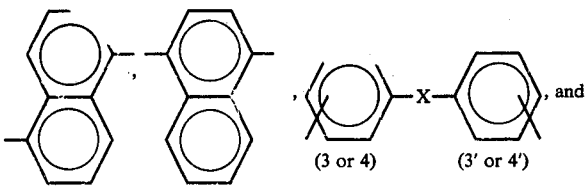

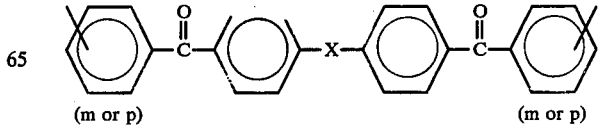

(m or p) (m or p)

X is selected from the group consisting of a divalent bond,

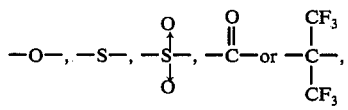

and all of the $R_1$ and $R_4$ groups need not be identical.

12. The cyclodehydrated products of claim 11.

13. The polymers and acid salts thereof represented by the following structural formula:

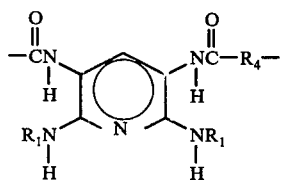

where $R_1$ is selected from the group consisting of $CH_3-$, $C_6H_5-$, $C_6H_5CH_2-$, and $C_5H_4N$-(pyridyl); $R_4$ is selected from m- or p-phenylene;

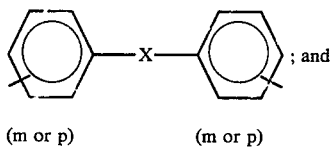; and

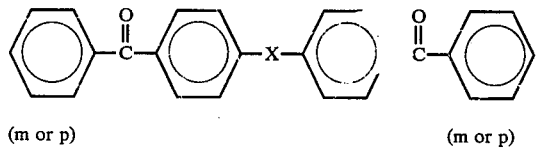

in which X is selected from a divalent bond

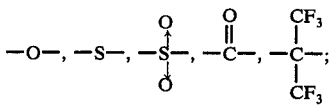

and all of the $R_1$ and $R_4$ groups need not be identical.

14. The cyclodehydrated products of claim 13.

15. A process for the preparation of the soluble heterocyclic polymers and acid salts thereof which consists of (1) adding $P_2O_5$ to a mixture of solvent and at least one acid salt of an aromatic tetraamine represented by the formulae

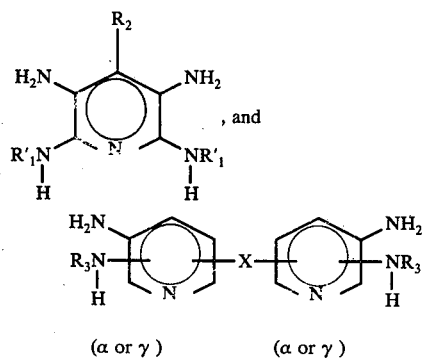

where $R'_1$ is a monovalent radical selected from hydrogen and $R_1$, and $R_1$ is as defined in claim 1, $R_2$ is as defined in claim 1, $R_3$ is a monovalent member selected from the group consisting of alkyl of 1 to 5 carbon atoms, and X is as defined in claim 3; and (2) then reacting the resulting mixture
with at least one acid derivative selected from the group consisting of bis(acid halide), mono(acid halide) anhydride or a tribasic acid, and dianhydride, wherein halide includes F, Cl, or Br;
said reaction being effected in the presence of $P_2O_5$ and an aprotic solvent for at least one of said reactants and at a temperature of about -10° C to about 70° C;
the total moles of acid derivatives being substantially equal to the total moles of amine salts.

16. The process of claim 15 wherein at least one tetraamine acid salt is partially replaced by at least one acid salt of an aromatic amine represented by one of the formulae:

$H_2N-R_7-NH_2$;

wherein $R'_1$ represents a monovalent member as defined in claim 15;

$R_8$ represents a monovalent radical selected from the group consisting of hydrogen and alkyl of 1 to 5 carbon atoms; and $R_7$ represents a divalent radical selected from the group consisting of carbocyclic aromatic radicals, biphenyls, single, fused, and multiple ring heterocyclic radicals and carbocyclic aromatic radicals bridged by a radical selected from the group of alkylene of 1 to 3 carbon atoms, oxygen, and sulfur and said aromatic radicals being those where up to two hydrogens ortho to an amine group are replaced by hydroxyl, mercapto or $-SO_2NH_2$ with the provision that no three consecutive adjacent ring positions are substituted by amine, hydroxyl, mercapto or $-SO_2NH_2$ groups.

* * * * *